(12) United States Patent
Garg et al.

(10) Patent No.: US 6,364,920 B1
(45) Date of Patent: Apr. 2, 2002

(54) CMP FORMULATIONS

(75) Inventors: Ajay K. Garg, Northborough; Brahmanandam V. Tanikella, Natick, both of MA (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 0 days.

(21) Appl. No.: 09/553,664

(22) Filed: Apr. 21, 2000

(51) Int. Cl.[7] .............................. C09K 3/14; C09G 1/02; C09G 1/04
(52) U.S. Cl. ........................ 51/309; 106/3; 23/293 R
(58) Field of Search .................. 51/307, 309; 106/3; 438/692, 693; 252/79.2; 423/265, 625, 626; 23/293 R

(56) References Cited

U.S. PATENT DOCUMENTS

| | | | | | |
|---|---|---|---|---|---|
| 4,186,178 | A | * | 1/1980 | Oberlander | 423/265 |
| 4,191,737 | A | * | 3/1980 | Irvine | 423/265 |
| 5,478,435 | A | * | 12/1995 | Murphy et al. | 156/636.1 |

* cited by examiner

*Primary Examiner*—Michael Marcheschi
(74) *Attorney, Agent, or Firm*—David Bennett

(57) ABSTRACT

CMP formulations comprising alumina particles and an iodate oxidizer can be stabilized against pH drift during use by acidification using an organic acid. Formulation pH stability can be further enhanced by treating the formulation at an elevated temperature before it is used.

6 Claims, No Drawings

CMP FORMULATIONS

BACKGROUND OF THE INVENTION

This invention relates to CMP ("chemical mechanical planarization") materials and specifically to CMP materials comprising alumina powders as the abrasive.

CMP is a process that is used to prepare semiconductor products of great importance in a wide range of electronic applications. Semiconductor devices are typically made by depositing a metal such as copper in spaces between non-conductive structures and then removing the metal layer until the non-conductive structure is exposed and the spaces between remain occupied by the metal. The demands placed on the abrasive are in many ways in conflict. It must remove the metal but preferably not the non-conductive material. It must remove efficiently but not so quickly that the process cannot be easily terminated when the desired level of removal has been reached.

The CMP process can be carried out using a slurry of the abrasive in a liquid medium and it is typical to include in the slurry, in addition to the abrasive, other additives having a "chemical" effect, including complexing agents; oxidizing agents, (such as hydrogen peroxide, ferric nitrate, potassium iodate and the like); corrosion inhibitors such as benzotriazole; cleaning agents and surface active agents.

The formulation is usually intended to operate within a narrow range of pH values since the pH significantly affects the material removal rate and therefore the predictability of the process. There is however a problem in that the pH of a formulation tends to drift with time such that a formulation has a definite "shelf life". In practice many formulations need to be made up just before use, which is inefficient.

The present invention provides a method of formulating a CMP formulation that gives a slurry with a remarkably stable pH for a very protracted period allowing consistent and predictable performance during that period.

DESCRIPTION OF THE INVENTION

The present invention provides a process for the production of a CMP slurry comprising alumina and an iodate oxidizing agent which comprises the steps of:
 a. acidifying an alumina slurry and an iodate solution to pH levels between 2 and 5 that differ by less than one pH point; and
 b. mixing the slurry and the solution in the desired proportions to produce a CMP formulation.

It is surprisingly found that this process causes the drift of pH over time to be very significantly reduced. The acid selected can be an inorganic acid such as the commonly used nitric acid, or more preferably it can be an organic acid such as formic acid, acetic acid, glycine, maleic acid, citric acid, proprionic acid or succinic acid and the like. The use of acetic acid is found to be a very effective and economic alternative with little in the way of handling problems attendant on its use.

It is further found that the stabilization of pH is enhanced further if the mixture, whether mixed before pH adjustment or pH adjusted prior to mixing as taught above, is treated to an elevated temperatures, that is from about 70° C. to about 250° C. (if conducted under hydrothermal conditions, for example in an autoclave), for a period from about 1 and often as long as 8 hours. The time of treatment varies inversely as the temperature of the treatment such that higher temperatures require shorter treatment times. Boiling at atmospheric pressure is effective if carried out for a period of from 5 minutes to eight hours or more preferably from 15 to 45 minutes is generally sufficient. To avoid loss of the dispersant medium and acid during the boiling it is preferred to boil under reflux. Enhancement of the pH stability can often be achieved in shorter times if carried out under hydrothermal conditions such as one minute at 180° C. It is believed that such heat treatments are also effective to minimize pH drift in polishing slurries not dedicated to CMP applications and which therefore do not comprise an oxidizer component.

The alumina slurry preferably comprises alpha alumina particles with an average primary particle size of from 0.02 to 0.5 micrometer though slurries with primary particle sizes from 0.01 to 1 micrometer are believed to benefit also from the process outlined herein.

The iodate oxidizing agent can be any one of those typically used in CMP applications such as alkali metal iodates and particularly potassium iodate.

DESCRIPTION OF PREFERRED EMBODIMENTS

The effectiveness of the process of the invention is illustrated by the following Example which comprises a series of tests in which typical CMP formulations are prepared from the same components but using different procedures. For each procedure the change in pH over a period of 24 hours was followed and recorded.

EXAMPLE 1

Procedure 1, (The standard prior art procedure).

20% solids alumina slurry with a pH of 4 10% solids potassium iodate solution with a pH of 7.3 Deionized water.

The above components were mixed to give a formulated slurry with 5% by weight of alumina and 5% by weight of potassium iodate with a pH of about 6.3. This was then acidified with nitric acid to a pH of about 2.8. In 24 hours this pH had risen to 3.48, (a drift of 0.74). This is enough to make a significant difference to the material removal rate.

Procedure 2, (Standard plus boiling).

The same formulation described above was boiled under reflux for 30 minutes after being formulated. In 24 hours the pH had drifted by 0.28. This is a big improvement that clearly illustrates the benefits of aging the formulation by boiling it.

Procedure 3, (Standard plus pre-acidification).

In this procedure, instead of adding the nitric acid to adjust the pH of the mixture after it has been formed, the addition is made to the iodate so that, when the iodate is added to the alumina slurry, it is already at the same pH. This resulted in a pH drift over 24 hours that was 0.74.

Procedure 4, (As for 3 except for the use of acetic acid).

This resulted in a very significant drop in the 24 hour pH drift. In fact the drift was only 0.23. There is clearly a distinct advantage in using acetic acid to adjust the pH rather than nitric acid.

Procedure 5, (As for 3 with 15 minutes of boiling of the formulation).

This reduced the 24 hour drift to 0.07. Therefore, at least with nitric acid acidification, the time of addition is not a big factor but the boiling of the mixture yielded very large benefits.

Procedure 6, (As for 4 with 15 minutes of boiling of the formulation).

This procedure achieved a drift of only 0.12 virtually all of which occurred in the first couple of hours. It seems therefore that the pH will remain for a protracted period at a level not significantly below that reached shortly after the formulation has been formed and boiled.

From the above results it becomes clear that there is significant advantage as regards stabilizing the pH of a CMP formulation if the pH is adjusted by the use of an organic acid such as acetic acid or if the pH-adjusted formulation is subjected to elevated temperatures for a period before it is used. If both these procedures are adopted, the advantage is even more significant.

EXAMPLE 2

In this Example the effect on tungsten removal rate for the products made by the procedures outline above were measured. The results are shown in the Table below.

| Procedure | pH Change | MRR (Å/min) |
| --- | --- | --- |
| #1 (Prior Art) | 0.74 | 1200 |
| #2 (#1 + boiling) | 0.28 | No Data |
| #3 (#1 + pre-adjust pH) | 0.74 | 1647 |
| #4 (as #3 but use acetic) | 0.23 | 1658 |
| #5 (as #3 + boil) | 0.07 | 1720 |

When the same materials were tested for removal of copper under similar conditions, the prior art procedure yielded an MRR of 2074 Å/min, whereas #6 gave 4761 Å/min. It is apparent therefore that the reduction of pH drift correlates to higher MRR values.

EXAMPLE 3

This Example shows that heating treatments other than boiling are also effective to stabilize pH drift.

Procedure #2 was used with the difference that the formulation was autoclaved at 160° C. for 5 minutes instead of boiling for 15 minutes. The 24 hour pH drift was 0.24.

We claim:

1. A process for producing a CMP formulation comprising an aqueous slurry of an alumina and an iodate oxidizer in which prior to mixing, both components are independently acidified to pH levels that differ by less than 1 pH point, wherein each component has a pH between 2 and 5.

2. A process according to claim 1 in which the components are acidified using an organic acid.

3. A process according to claim 2 in which the organic acid is selected from the group consisting of glycine, formic acid, acetic acid, propionic acid, maleic acid, citric acid and succinic acid.

4. A process according to claim 1 in which the formulation is subjected to a temperature from 70 to 250° C. for a period in excess of one minute.

5. A process according to claim 1 in which the alumina comprises alumina particles with an average primary particle size of from 0.02 to 0.5 micrometer.

6. A process according to claim 1 in which the iodate oxidizer is an alkali metal iodate.

* * * * *